Figure 1:
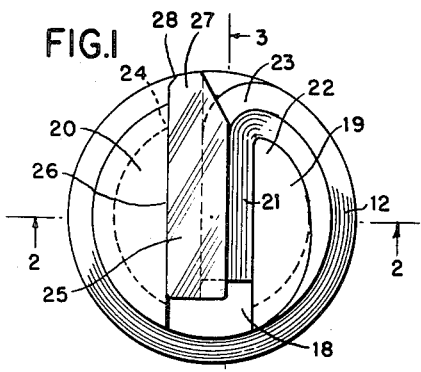

Feb. 26, 1957 J. O. FORSTER ET AL 2,782,674
COIL SPRING THREAD HAVING SHEAR-PREVENTING AND LOCKING MEANS
Filed May 26, 1954

John O. Forster
Adolph H. Mussgnug
INVENTORS
BY *Walter S. Heston*
ATTORNEY

United States Patent Office 2,782,674
Patented Feb. 26, 1957

2,782,674
COIL SPRING THREAD HAVING SHEAR-PREVENTING AND LOCKING MEANS

John O. Forster, Harrison, N. Y., and Adolph H. Mussgnug, Danbury, Conn., assignors to Heli-Coil Corporation, Danbury, Conn., a corporation of Delaware Application May 26, 1954, Serial No. 432,452

5 Claims. (Cl. 85—46)

The invention relates to lock studs or screws having self locking properties with the aid of a screw-thread-forming wire coil applied thereto.

Wire coils are frequently used to provide a hard and wear- and galling- or seizing-resistant screw-thread lining in a softer boss or nut material. It has also been proposed to provide a screw connection with a screw thread wire coil thereon which has certain locking properties. Such wire coils may even be used for the combined purpose of lining and locking.

In most forms of application, the screw-thread-forming wire coil has a diametrical tang in continuation of one of its end convolutions. The tang either forms a grip for a tool for screwing the coil as a lining in a tapped hole of a boss or nut, or the tang is used for engagement in a slot in the end of a screw or stud while the coil convolutions are embedded in the thread groove of the screw. When the coil has to serve as a lining it is first screwed into the boss or nut whereupon the tang may be broken off before the screw or stud is screwed into the coil. As a locking element, the coil is first applied to the screw with the tang caused to engage in the end slot whereupon the screw or stud with the coil thereon may be screwed into the tapped hole of the boss or nut. Thus when the wire coil is merely used as a thread lining, the function of the tang is finished with the insertion of the coil. If, however, the locking feature of the coil is desired, the tang has to remain in the slot of the screw, on the one hand, in order to retain the coil anchored to the screw, on the other hand, to receive the torque exerted when the screw tends to turn in the direction for unscrewing, and to transmit such torque to the adjoining end convolution of the coil. This torque tends to spread the coil so as to urge it into its seat in the thread groove of the boss or nut, and to hold it therein immovable owing to the friction set up. In this manner the coil is secured to both the screw and the boss and, thus, the screw or stud is locked to the nut or boss.

However, the conventional connection between the coil tang and the stud or screw has a drawback. When an unscrewing torque occurs the tang bears against a sharp edge of the slot near the bend between the tang and the adjoining end convolution at a point which is at some distance from the median circumference of the convolution. In consequence, a bending moment exists, and if the torque occurs oscillatingly as it frequently happens when there are vibrations, it is merely a question of time when the tang will break off and the locking feature will be lost.

The invention aims therefore to avoid the mentioned drawback and to provide a means whereby the mentioned bending moment can be eliminated and the tang reaction to an unscrewing torque will be against a surface rather than against a more or less sharp edge. The invention contemplates the provision of a key between the tang and the wall of the mentioned slot and extending lengthwise beyond the slot preferably as far as or substantially as far as the bottom of the tapped thread groove of the boss or nut to which the stud or screw is intended to be applied.

Figure 2:
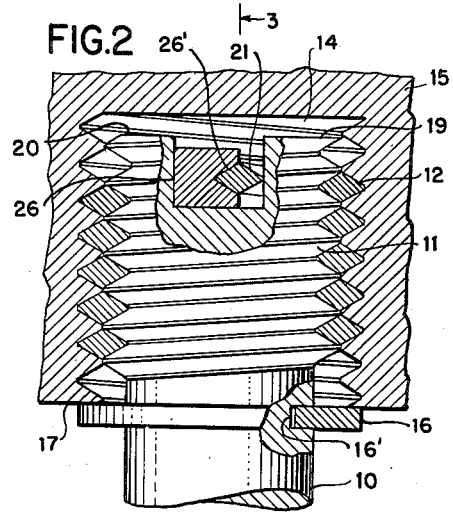
Figure 3:
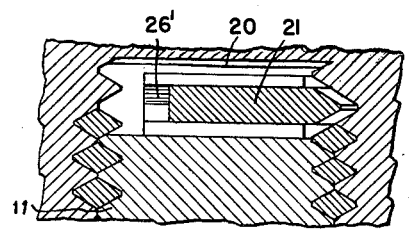
Figure 4:
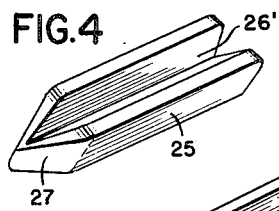
Figure 6:
Figure 7:
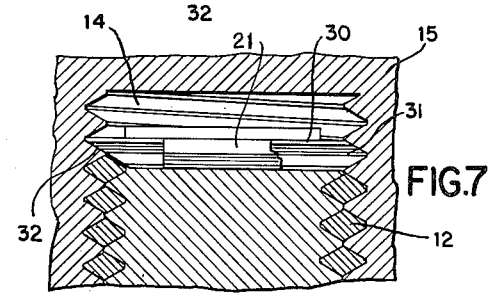
Figure 8:
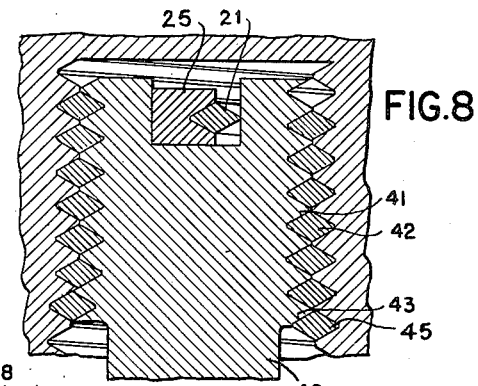
Figure 5:
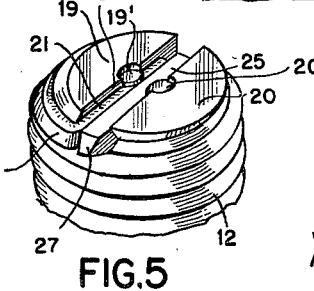

Further objects and details of the invention will be apparent from the description given hereinafter and the accompanying drawing illustrating an embodiment thereof by way of example. In the drawing, Fig. 1 is an end view of a slotted stud with a tanged coil thereon and a key according to the invention, Fig. 2 is a side-elevation of the stud with coil and key in section along line 2—2 of Fig. 1, Fig. 3 is a cross-section along line 3—3 of Fig. 1, Fig. 4 is a perspective view of the key of Fig. 1, Fig. 5 is a perspective view of the end of the stud on a smaller scale, Fig. 6 is a perspective view of a modified key, Fig. 7 is a cross-sestion of a stud with the key of Fig. 6 in position, and Fig. 8 is a cross-section of a slightly modified stud.

Referring now to the drawing Figs. 1 to 5, a screw or stud 10 is provided with an external thread 11 of the end portion of its shank. A cylindrical wire coil 12 is wound into the groove of thread 11 and engages the tapped thread 14 of a nut or boss member 15. The stud 10 with the coil 12 thereon is screwed in so that a shoulder 16 of the stud bears against the boss surface 17. Shoulder 16 may be one piece with the stud 10, or it may be formed as shown by a spring ring engaging in a peripheral groove 16'. The ultimate end of the stud is slotted at 18 whereby two end portions 19 and 20 of the stud are formed. The adjacent end convolution of the coil 12 is continued by a diametrically directed tang 21 which engages the slot 18. The end portion 19 is cut and rounded off at 22 to allow for the space required by the bend 23 of the wire where the tang adjoins the adjacent coil convolution. In an earlier design of a slotted lock stud with tang-provided wire coil, the slot is of substantially the same width as the tang. In such a structure the point 24 of the end portion 20 opposite the bend 23 constitutes a danger as it exercises a shearing effect tending to cut off the tang at the bend when a torque tries to unscrew the stud. If on the other hand, the sharp edge at point 24 would be rounded off, the bending moment near the bend 23 would be increased which is caused by the fact that the reaction to the force of the torque will be at a greater distance from the point where the force acts tangentially on the coil wire. Such increased bending moment is as harmful as the mentioned sharp edge. In order to avoid these drawbacks and as clearly shown in Figs. 1 and 2, the width of the slot 18 is substantially greater than the thickness of the coil wire which in the illustrated embodiment is of a diamond cross-section but may be of any other suitable cross-section if so desired. Between the tang 21 and the wall of the end portion 20 a key 25 is inserted which bears flatly with its side 26 against the slot wall of the shank portion 20. Opposite its side 26 the key is lengthwise grooved at 26'. The groove is so formed that the length of the tang over half of its cross-section fits snugly into that groove. In the embodiment of Figs. 1 to 5 groove 26' is of a 60° V-shape according to the form of a standard thread. The length of the key extends beyond the slot at least with the end 27 adjacent the bend 23. This end 27 is beveled from the sides to a 60° profile so that it can engage in the groove of the thread 14 in front of the bend 23. In other words, the cross-section of the end 27 parallel to the side face 26 is similar to the outer portion of the cross-section of the coil wire. Preferably, the dimensions are so selected that the tang with the key fit tightly in the slot. Thereby the key due to the friction is prevented from shifting lengthwise while the tang engaging the V-groove 26' holds the key in the slot. It is advisable to"

round off the sharp corner of the key at 28 to prevent it from seizing in the groove of the thread when the stud with the coil and key thereon is screwed into the tapped hole of the boss. As the V-groove of the key extends practically to the bottom of the groove as the thread 14, point 24 cannot act as a shearing edge on the bend, and the reaction to an unscrewing torque will be exercised practically at the point where the force of the torque occurs so that the tang will be relieved from carrying the load. Thus, any torque which may come into existence and tend to unscrew the stud 10 will act through the key 25 on the bend 23 so as to expand the coil whereby the latter will frictionally wedge into the thread 14. In other words, against a torque tending to unscrew the stud the coil will be anchored to the nut or boss 15 and the stud will be secured to the coil by the tang and key in the slot whereas an undesired screwing-in torque which may occur due to vibrations will be taken up by the collar 16 bearing on the surface 17 of the boss.

It has been stated that the key 25 owing to its tight fit is prevented from moving lengthwise. The resistance to any movement of the tang and key in the slot may be increased by peening material of the stud ends 19 and 20 down as indicated in Fig. 5 at 19' and 20'. Other suitable means may be applied as well for that mentioned purpose. For instance, the key may be made so long that it engages the thread of the boss not only with the end adjacent the bend of the coil but also with its other end. Thereby any lengthwise shift of the key can be positively prevented. A key for that purpose is shown in Figs. 6 and 7, and in general denoted by 30. The one end 31 of the key is shaped like the end 27 of the key 25 in Figs. 1 to 5. Its other end, however, has a face at a slant with respect to the longitudinal extension of the key in accordance with the shape of the portion of the thread of the boss diametrically opposite the point where the end 31 engages in the groove of the thread. In consequence, the face 32 can bear partly against the adjacent face of a coil convolution and partly against a flank of the thread 14, as clearly shown in Fig. 7. Means other than those shown in Fig. 2 may be provided for preventing the stud from being screwed in beyond a predetermined length. For this purpose, in the modification of Fig. 8, the stud 40 is provided with the external thread 41 to receive thereon the coil 42. The end convolutions 43 of the thread 41 are imperfect, i. e. the thread grooves are shallower than the remainder of the thread 41. In consequence, the end convolutions 45 of the coil engaging the convolutions 43 are peripherally extended and thus limit the length to which the stud can be screwed into a boss. It will be clear that the key form of Figs. 1 to 5 as well as the key form of Figs. 6 and 7, may be used with any one of the studs shown in the drawing.

Thus the invention provides a lock stud or screw which can be readily screwed into a boss with the slotted end leading to a depth determined by the distance of a means such as the collar 16, or the expanded end convolution 45, and which will be locked in its position by means of the tang and key in the slot causing an expansion of the adjacent coil end when a torque tending to unscrew the stud occurs.

It will be apparent to those skilled in the art that many alterations and modifications of the structure shown may be made without departure from the essence and spirit of the invention which for that reason shall not be limited but by the scope of the appended claims.

I claim:

1. A lock stud or screw comprising a shank including a screw-threaded end portion and being provided with a diametrically extending slot in its end, a wire coil having inner and outer thread-forming portions and being wound on said end portion so as to engage said thread thereof with the inner portions and to project from the thread of said end portion with said outer portions, said coil including a diametrical tang in continuation of the end convolution of said coil adjacent said slot so that there is a bend between said tang and said end convolution, said tang engaging in said slot and bearing against the slot wall adjacent said end convolution, and a key having opposed faces and being tightly fitted with said faces in said slot between the opposite wall of the latter and said tang, said key extending with its one end which is adjacent said bend beyond said slot in front of said end convolution substantially as far as the outer diameter of said coil, said key end being shaped substantially according to the outer portion of said coil wire so as to be adapted to engage in the same thread groove the wire coil on said stud or screw is intended to engage.

2. A lock stud or screw as claimed in claim 1 including, near the opposite end of said threaded shank portion, a peripheral projection limiting the depth to which the coil-provided shank portion can be screwed into a tapped hole.

3. A lock stud or screw as claimed in claim 1, said key being lengthwise grooved according to the shape of the outer portions of the cross-section of said coil wire, and said tang being embedded with its outer portion in said groove of said key.

4. A lock stud or screw as claimed in claim 1 further comprising means engaging said tang and said key for preventing said tang and key from any movement in said slot.

5. A lock stud or screw according to claim 1, the other end of said key also extending substantially as far as the outer diameter of said coil, said other end of said key having a face at a slant with respect to the longitudinal extension of the key, so that said other end can bear on the adjacent coil convolution.

No references cited.